United States Patent [19]

Hayes

[11] Patent Number: 4,889,542
[45] Date of Patent: Dec. 26, 1989

[54] COMPUTER AIR FILTER DEVICE AND METHOD

[76] Inventor: William J. Hayes, 31 Black Horse Pike, Collings Lake, N.J. 08094

[21] Appl. No.: 270,203

[22] Filed: Nov. 14, 1988

[51] Int. Cl.$^4$ ............................................. B01D 46/02
[52] U.S. Cl. ..................................... 55/97; 55/385.4; 55/385.6; 55/471; 55/493; 55/502; 55/508; 174/16.1; 361/384
[58] Field of Search ................. 55/385.2, 385.4, 385.6, 55/467, 471, 472, 493, 502, 508, 528, 97, DIG. 31, DIG. 42; 361/384; 174/16.1

[56] References Cited

U.S. PATENT DOCUMENTS

| | | | |
|---|---|---|---|
| 2,966,960 | 1/1961 | Rochlin | 183/73 |
| 3,127,259 | 3/1964 | Boylan | 55/DIG. 31 X |
| 3,143,997 | 8/1964 | Norberg et al. | 116/114 |
| 3,171,820 | 3/1965 | Volz | 260/2.5 |
| 3,323,437 | 6/1967 | Knab | 98/40 |
| 3,415,384 | 12/1968 | Kasten | 210/484 |
| 3,740,735 | 6/1973 | Gabor | 340/174.1 |
| 3,971,877 | 7/1976 | Lee | 174/16.1 |
| 4,354,489 | 10/1982 | Riaboy | 128/206.14 |
| 4,549,887 | 10/1985 | Joannou | 55/493 X |
| 4,639,261 | 1/1987 | Pittman et al. | 55/502 |
| 4,659,349 | 4/1987 | Rodi et al. | 55/385.4 |
| 4,702,154 | 10/1987 | Dodson | 361/384 X |
| 4,753,573 | 6/1988 | McKnight | 55/467 |

FOREIGN PATENT DOCUMENTS 0159820 12/1980 Japan .

OTHER PUBLICATIONS

Tech Sheet–Scott Industrial Foam (SIF), Flexible Porous Cellular Plastic by Scott Foam Corporation, (See third column, Additional Uses, G. Electrical Equip).
Tech. Sheet–Protectair II, Filter Foam by Scott Foam Corporation, Foam No. TS-1020.
Scott Foam Cellular Plastics for Filtering Functions by Scott Foam Corp., Form No. FS1001.
Tech. Sheet Scott Foam–Filter for Filtration Applications by Scott Foam Corp., Form-TS 3644.

Primary Examiner—Charles Hart
Attorney, Agent, or Firm—Thomas A. Lennox

[57] ABSTRACT

A filter panel is provided to be adhesively attached to the outside of computer and disk drive housings to cover the air intake grids used to draw air into the housing by a draft from a cooling fan in the housing, with the filter device of a porous permeable reticulated flexible polyester polymeric foam about ¼ inch thick with permanently adhered adhesive strips on the back side to removably attach the foam over the air intake opening, with a frame hinged to fit over disk drive slot spring to seal over opening.

21 Claims, 2 Drawing Sheets

U.S. Patent    Dec. 26, 1989    Sheet 1 of 2    4,889,542
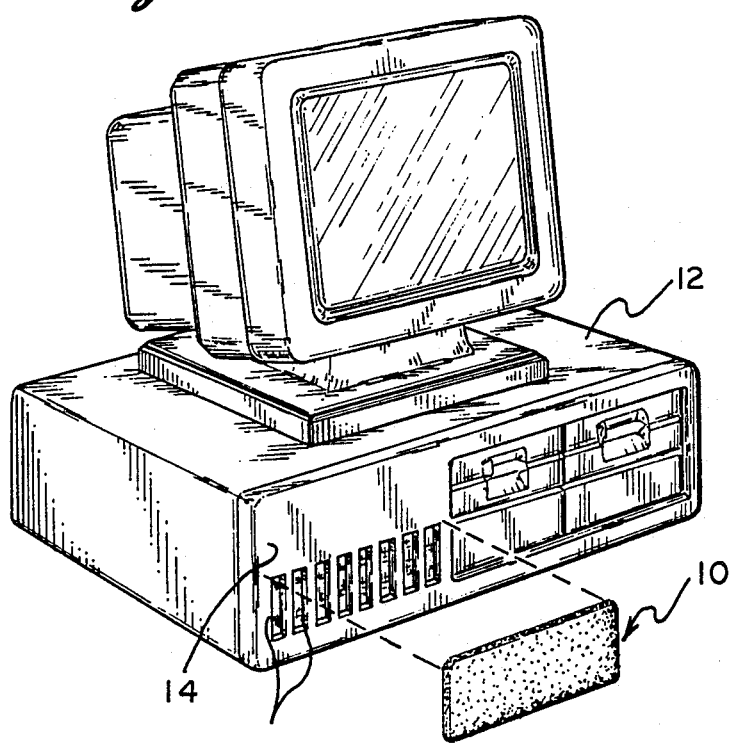
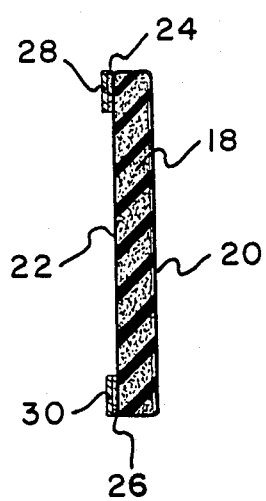
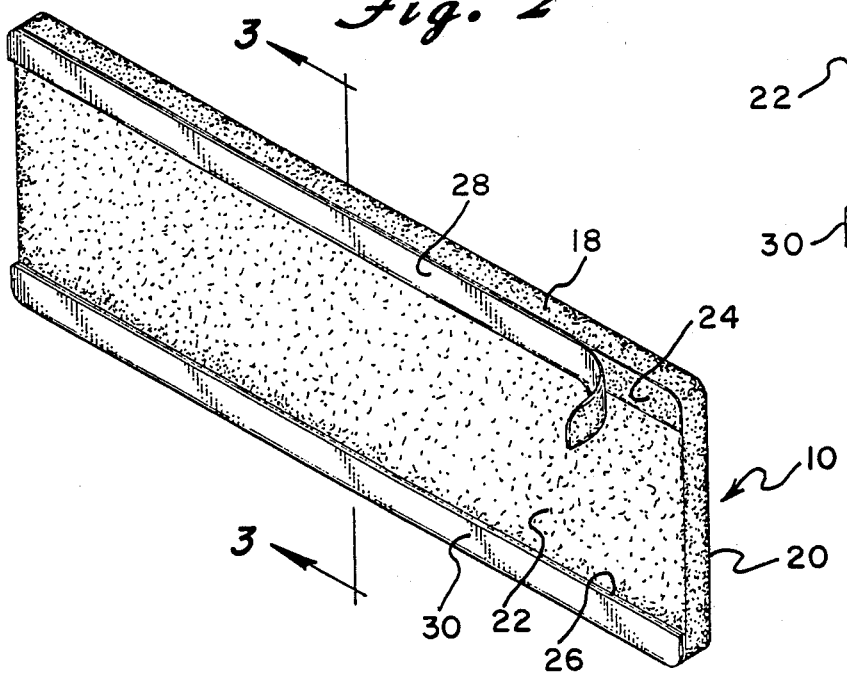

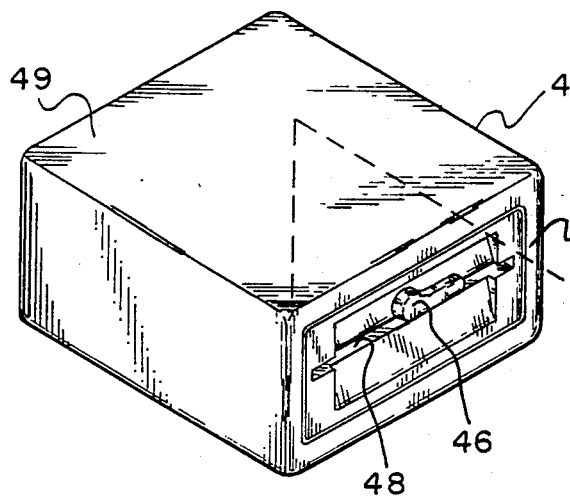
Fig. 4
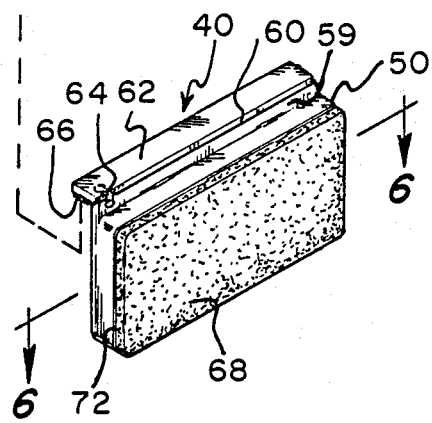
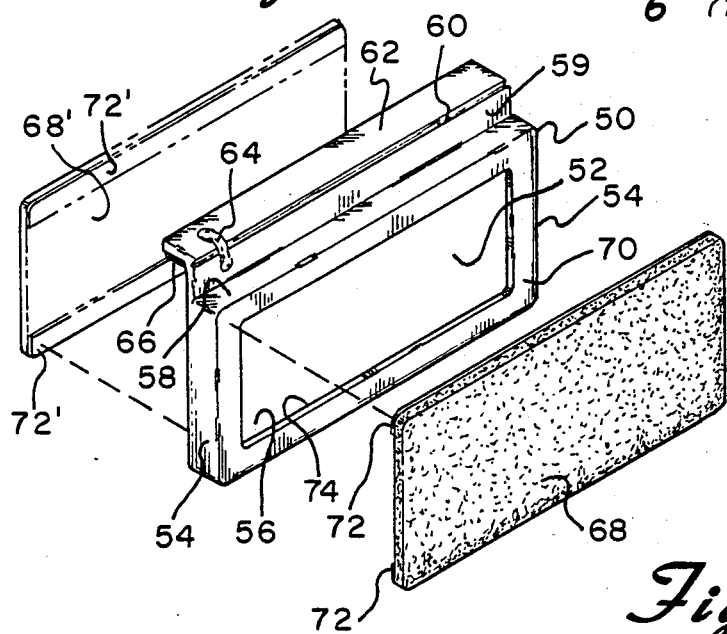
Fig. 5
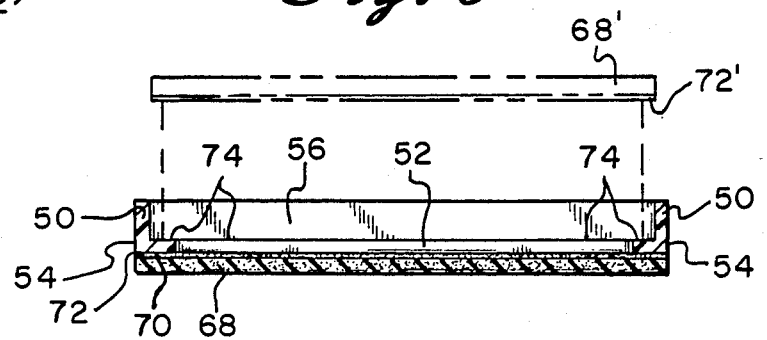
Fig. 6

COMPUTER AIR FILTER DEVICE AND METHOD

BACKGROUND OF THE INVENTION

This invention involves a filtering device for use on computer apparatus to essentially prevent the accumulation of dust and dirt inside the housing.

In the smallest of computer systems, no fan is required to cool the electronic components. However, for most personal computers, in particular the IBM XT, IBM AT, the various clones as well as the larger Mackintosh computers, an internal fan is included inside the computer cabinet, referred to as the housing. The power systems, internal disk drives, and particularly the hard disk drives, generate a substantial amount of heat. High temperatures will destroy or at least substantially reduce the life of the computer components so that a fan system is typically included in most of these personal computers. The fan is inside the housing drawing a draft into the housing through an air intake opening through the housing wall. This opening is typically a grate molded directly into the plastic housing of the computer.

At one time, essentially all computers were main frame types and were kept in clean rooms under highly controlled conditions. With the advent of the powerful personal computers which can now perform almost as well as the main frame computers did a few years ago, these small computers find their way into use under all sorts of conditions. Many small offices, for example, are not maintained in a most clean condition. In any case, there is little attempt in most offices to maintain a "dust-free" environment. After only a few months of use, a substantial amount of dust and dirt is drawn in through the air intake grids of the personal computer. Most of that dust settles on or is drawn by statistic electricity to the various components inside the cabinet. It is recognized that these components are sensitive to the accumulation of dirt, dust and even smoke entering and adhering to the vital internal components. Dust covers have been provided but these are inconvenient and seldom used. Furthermore, and most importantly, these covers offer no protection during computer operation. It is further recognized that a major portion of computer equipment failure is directly related to the accumulation of this dirt, dust and smoke particles inside the housing adhering to key components. Despite this recognition, little beyond the recommendation of dust covers and periodic cleaning by a skilled technition has been offered to alleviate the problem. The various devices and methods available in the prior art have not satisfied this problem nor attain the objects described hereinbelow.

SUMMARY OF THE INVENTION

It is an object of the present invention to provide a device to essentially prevent the dirt, dust and smoke particles present in the typical office environment from entering the computer cabinet.

It is a specific object of the present invention to provide a filtering device which does not require opening of the cabinet to install internal components.

It is a specific object of the present invention to provide a filtering device which can be attached on the exterior of the computer housing so that it is in full view and can be continuously visually monitored as to its performance as to the accumulation of dust, dirt and smoke particles, in order to determine when it should be replaced.

It is a specific object of the present invention to provide a filtering system which will diminish the air born contaminants from entering the cabinet, but provide a negliable reduction in the rate and volume of air flow entering into the computer cabinet so as to not significantly reduce the cooling effect of the fan system provided by the manufacturer.

It is a particular object of the present invention to provide a filtering device that reduces or essentially eliminates the coating of the chips and boards in the computer cabinet with dust and dirt particles which lead to excess heat build up and contact corrosion.

It is a further object of the present invention to provide a disposable filtering device that may be easily removed and discarded when the dust and dirt accumulated into the filter begins to reduce the air flow through the filter into the cabinet.

A specific object of the present invention is to provide a filtering device that requires no tools or special handling to install the device on the computer housing or to remove it for replacement.

It is an additional object of present invention to provide a filter device which will interfit over the disk slot opening of a disk drive and not be interfered with by the handle extending outwardly from the opening on the disk drive.

It is a specific object of the present invention to provide a filter device which attaches to and covers a disk slot in a disk drive and pivots away from the opening to insert and remove disks, but automatically recovers to seal off the opening from unwanted dust and dirt entering the disk slot.

It is preferred that the filter device further include a frame around a frame opening, the frame being abuttable with a front surface of the computer housing surrounding the air intake opening, and that the form filtration panel has an inside surface and an outside surface, the panel being of a size and shape sufficient to entirely cover the frame opening. It is further preferred that the adhesive means on the foam panel removably adhere the foam panel to the frame, and that the frame and foam panel cover the air intake opening sufficiently to require essentially all air flow into the intake opening to pass through the foam panel. It is further preferred that the frame include a front surface, side walls extending away from the front surface forming a space behind the front surface, and rear edges of the side walls abuttable with the front surface of the computer housing surrounding the air intake opening. It is further preferred that the size and shape of the panel, frame and the space allow the foam panel to adhesively adhere to the outside surface of the frame or in the alternative to the frame in the space behind the frame. It is further preferred that the filter device further include a hinge means hingeably attaching the frame to the housing allowing the frame to be swung away from the housing to expose the air intake opening. It is further preferred that the hinge means further include a spring means to springably urge the rear edges of the side walls against the front surface of the housing.

The invention is also a filter device for use on a computer apparatus that includes a heat generating electronic mechanism in a housing with an air intake opening through the housing, the opening having a length and positioned to draw air into the housing by a draft from a fan means in the housing. The filter device includes a frame around a frame opening with a front surface, side walls extending away from the front surface forming a space behind the front surface, and rear edges of the side walls abuttable with a front surface of the computer housing surrounding the air intake opening. The device further includes a foam filtration panel, having an inside surface and an outside surface, the panel being of a size and shape sufficient to entirely cover the frame opening, wherein the foam panel is porous and permeable reticulated flexible polymeric foam having three dimensional skeletal strands, and an adhesive means on the inside surface of the foam panel of sufficient adhesively adhere the foam panel to the outside surface of the frame or in the alternative to the frame in the space behind the frame. The frame and foam panel cover the air intake opening sufficiently to require essentially all air flow into the intake opening to pass through the foam panel.

The invention is a filter device for use on a computer apparatus that includes a heat generating electronic mechanism in a housing with an air intake opening through the housing, the opening having a length and positioned to draw air into the housing by a draft from a fan means in the housing. The filter device includes a foam filtration panel, having an inside surface and an outer surface; the panel being of a size and shape sufficient to entirely cover the intake opening. The device further includes an adhesive means on the inside surface of the foam panel of sufficient length to allow the inside surface of the foam panel to be adhesively adhered to an outside surface of the computer housing and positioned to cover the air intake opening sufficiently to require essentially all air flow into the intake opening to pass through the foam panel. The foam panel is porous and permeable reticulated flexible polymeric foam having three-dimensional skeletal strands, has a pore size in the range of about 40 to about 90 pores per lineal inch, and has a thickness in the range of about 3/16 inch to about 5/16 inch.

It is preferred that the polymeric foam include polyester urethane polymer, and that the contact adhesive strips be along the entire lengthwise edges of the foam panel. It is also preferred that the pore size be 55 to 65 pores per lineal inch, and that the thickness of the foam panel be ¼ inch.

It is preferred that the adhesive means be a two sided adhesive film with one side permanently bonded to the foam and the other side a removable adhesive detachable from the machine. It is also specifically preferred that the foam be anti-static which is useful in retarding the accumulation of dust and dirt particles, but also avoids or even reduces the tendency of static electricity to accumulate which might endanger or damage the computer components, specifically the disks or disk drives. It is preferred that the foam be white in color to aid in the visual determination of dirt accumulation on and in the filter and to make an estimate as to the time the filter has been in place exposed to light.

The invention is also a method of maintaining internal cleanliness in a computer apparatus that includes a heat generating electronic mechanism in a housing with an air intake opening through the housing, the opening having a length and positioned to draw air into the housing by a draft from a fan means in the housing. The method includes providing a foam filtration panel including an inside surface and an outer surface, the panel being of a size and shape sufficient to entirely cover the intake opening, and a pair of adhesive surface strips on the inside surface along lengthwise edges of the foam panel. The foam panel has the same elements as above. The method also includes adhesively adhering the foam panel to an outside surface of the computer housing and positioning the panel to cover the air intake opening sufficiently to require essentially all air flow into the intake opening to pass through the foam panel.

BRIEF DESCRIPTION OF THE DRAWINGS

FIG. 1 is a perspective view of a filter device of the present invention shown in an exploded view illustrating how it is attached over the air intake grids of a computer housing.

FIG. 2 is a perspective view of the back side of the filter device illustrated in FIG. 1.

FIG. 3 is a cross-sectional view taken along line 3—3 of FIG. 2.

FIG. 4 is a perspective view of a second filter device of the present invention shown in an exploded view illustrating attachment over the disk insertion slot of an external disk drive.

FIG. 5 is an exploded perspective view of the filter device illustrated in FIG. 4.

FIG. 6 is a cross-sectional view taken along lines 6—6 of FIG. 4.

DESCRIPTION OF PREFERRED EMBODIMENTS

The foam panel is a polyester urethane polymeric foam that is porous and permeable with the three dimensional structure being reticulated skeletal strands. Satisfactory polymers include polyester, polyester-urethane, ester type of polyurethane, and other like polymers. The polyester polymeric foam is preferred. Typical filter foam material useful in this invention is SCOTT ® filter foam, SIF ® supplied by ScotFoam Corporation, a subsidiary of GFI, 1500 East Second Street, Eddystone, Pa. This polymeric foam filtering material is provided in nominal porosity grades from 10 to 100 as described in the technical data sheets Form No. TS-3644, TS-1023, FS-1001. This foam material is further described in U.S. Pat. No. 3,171,820 to R. A. Volz which issued Mar. 2, 1965 which describes reticulated foams and the process for their production. The technical data sheets and the United States patent are incorporated by reference thereto. A particular pore size of 55 to 65 pores per lineal inch with a foam panel thickness of one-quarter inch is most effect to provide excellent protection from the infiltration of dust, dirt and smoke particles but without unduly restricting the air flow volume and velocity into the air intake opening so as to avoid reducing the effectiveness of the cooling fan provided by the manufacturer. The presence of the filter over a period of time reduces the heat accumulation of the components in that the chips and boards inside the cabinet do not receive a coating of dust and dirt so there is less heat build up due to the insulation effect of that coating. As the pore size of the foam panel is increased to about 40 pores per lineal inch, there is a marked reduction in the effectiveness of filtration allowing the smaller particle size contaminates, such as smoke particles to enter into the cabinet more freely. As the pore size as is reduced to about 80 pores per lineal inch, the air flow is unsatisfactorily reduced into the housing cabinet, particularly with substantial accumulation in the foam of dust and dirt over a period of time. The specific foam used to construct filter device 10 illustrated in FIGS. 1 through 3 is Scot SIF ® industrial foam in porosity grade 60, reported to have a minimum of 55 pores per lineal inch and a maximum of 65 pores per lineal inch. The two closest grades, 45 and 80, are barely satisfactory and grades further removed are not satisfactory. Anti-static properties are incorporated into the foam to reduce the tendency of the dust and dirt to be attracted into the computer housing and to avoid interference with the memory retention. The foam panel is provided in a white or natural color which allows the user to readily identify the accumulation of dust and dirt and to replace the filter by mere visual evaluation.

In FIG. 1, filter device 10 is shown exploded away from attachment over grid vent opening 16 through front panel 14 of computer housing 12. In FIG. 2, filter device 10 is viewed from the rear of foam panel 18 showing inside surface 22 with outside surface 20 hidden in this view. Two sided adhesive tape strips 24 and 26 extend along the lengthwise edges of panel 18 on surface 22. Adhesive tape 24 and 26 is a double-coated polyester film with a permanent rubber base adhesive on one side that permanently adheres to the foam panel and a removable acrylic adhesive on the other side which is adhesively attached to front panel 14. Paper strips 28 and 30 protect the exposed adhesive surface until it is attached to the computer housing. FIG. 3 shows the relative shape and dimensions of foam panel 18. In FIG. 4, disk drive 42 is provided as an external piece of hardware with the cooling fan drawing air in through the opening 46 which receives the disks engaged with handle 48. The housing of disk drive 42 includes front wall panel 44 and top 49. While air is drawn through opening 46, it is also necessary to have that opening excessible to receive the disks. It is therefore necessary that any filter device covering opening 46 be openable. Filter device 40 includes frame 50 surrounding opening 52. As with most disk drives, handle 48 extends outwardly past the surface of front face 44. Thus, if a foam panel were attached flush to face 44, handle 48 would be in the way. Filter device 40 includes frame 50 from which it extends vertical extension panel 59 at the top of which is hingeably attached horizontal hinge panel 62 connected at "V" cut hinge 60 cut all along the adjacent edges of panels 59 and 62. The entire frame device with the hinge is a single integral molding of a polymeric plastic. Doubled sided adhesive tape 66 is attached on the underside of horizontal panel 62 and is adhered on the bottom side of the adhesive to top 49. Foam panel 68 is attached on the front face of frame 50. In the exploded view of FIG. 5, it is shown how foam panel 68 which is of a similar composition to foam panel 18, is adhered by adhesive strips 72 on the top lengthwise edge and on the bottom lengthwise edge, mostly hidden in this view. Adhesive strips 72 attach permanently to foam 68 but provide a removable adhesive attachment on front face 70 of frame 50 which includes side walls 54 and top wall 58. Frame 50 surrounds frame opening 52 which is essentially a rectangular opening of a smaller size than foam panel 68. Extending upwardly from the rear of top wall 58 is vertical extension 58 which terminates at "V" cut hinge 60 to which is connected horizontal hinge panel 62. On the underside of horizontal hinge panel 62 is double sided adhesive tape 66 which permanently adheres panel 62 to top 49 of disk drive 42. Molded in spring member 64 aids in urging vertical panel 59 and thus frame 50 rearwardly to urge the rear edges of frame 50 against front face 44 of disk drive 42. If handle 48 extends outwardly past front face 44, foam panel 68 is adhered to front surface 70 of frame 50 as illustrated. However, as illustrated in the shadow view, should handle 48 be set inside and to the rear of front face 44, foam panel 68' may be attached in space 56 formed behind frame 50 and behind front surface 70 formed by side walls 54 and top wall 50 again adhesively attached by adhesive strips 72', this time with the foam panel facing in the opposite direction. The cross-section of 56 shows the positioning of foam panel 68 on the outside on in its alternative position at 68'.

While this invention has been described with reference to the specific embodiments disclosed herein, it is not confined to the details set forth and the patent is intended to include modifications and changes which may come within and extend from the following claims.

I claim:

1. A filter device for use on a computer apparatus that comprises a heat generating electronic mechanism in a housing with an air intake opening through the housing, the opening positioned to draw air into the housing by a draft from a fan means in the housing, the filter device comprising:
    (a) a foam filtration panel, having an inside surface and an outside surface, the panel being of a size and shape sufficient to entirely cover the intake opening, and
    (b) adhesive means permanently adhered to the inside surface of the foam panel of sufficient length to allow the inside surface of the foam panel to be removably adhesively adhered to an outside surface of the computer housing and positioned to cover the air intake opening to require essentially all air flow into the intake opening to pass through the foam panel, wherein the foam panel:
        (i) is porous and permeable reticulated flexible polymeric foam having three-dimensional skeletal strands,
        (ii) has a pore size in the range of about 40 to about 90 pores per lineal inch, and
        (iii) has a thickness in the range of about 3/16 inch to about 5/16 inch.

2. The filter device of claim 1 wherein the adhesive means comprises strips of contact adhesive along both lengthwise edges of the foam panel.

3. The filter device of claim 1 wherein the polymeric foam comprises polyester polymer.

4. The filter device of claim 1 wherein the polymeric foam comprises an antistatic composition.

5. The filter device of claim 1 wherein the polymeric foam is white in color.

6. The filter device of claim 1 wherein the pore size is 55 to 65 pores per lineal inch.

7. The filter device of claim 1 wherein the thickness of the foam panel is ¼ inch.

8. The filter device of claim 1 further comprising:
    (a) a frame around a frame opening, the frame abuttable with a front surface of the computer housing surrounding the air intake opening,
    (b) the foam filtration panel, having an inside surface and an outside surface, the panel being of a size and shape sufficient to entirely cover the frame opening,
    (c) adhesive means on the foam panel to removably adhere the foam panel to the frame,
    wherein the frame and foam panel cover the air intake opening sufficiently to require essentially all air flow into the intake opening to pass through the foam panel.

9. The filter device of claim 8 wherein the frame comprises a front surface, side walls extending away from the front surface forming a space behind the front surface, and rear edges of the side walls abuttable with the front surface of the computer housing surrounding the air intake opening, and the size and shape of the panel, frame, and the space allow the foam panel to adhesively adhere to the outside surface of the frame or in the alternative to the frame in the space behind the frame.

10. The filter device of claim 8 further comprising a hinge means hingeably attaching the frame to the housing allowing the frame to be swung away from the housing to expose the air intake opening.

11. The filter device of claim 10 wherein the hinge means further comprises a spring means to springably urge the rear edges of the side walls against the front surface of the housing.

12. The filter device of claim 8 wherein the shape and size of the frame, the space, and the foam are all sufficient to allow the foam panel to be adhesively attached either to the front surface or in the space behind the front surface.

13. A filter device for use on a computer apparatus that comprises a heat generating electronic mechanism in a housing with an air intake opening through the housing, the opening having a length and positioned to draw air into the housing by a draft from a fan means in the housing, the filter device comprising:
(a) a frame around a frame opening with a front surface, side walls extending away from the front surface forming a space behind the front surface, and rear edges of the side walls abuttable with a front surface of the computer housing surrounding the air intake opening,
(b) a foam filtration panel, having an inside surface and an outside surface, the panel being of a size and shape sufficient to entirely cover the frame opening, wherein the foam panel is porous and permeable reticulated flexible polymeric foam having three-dimensional skeletal strands, and
(c) adhesive means on the inside surface of the foam panel of sufficient adhesively adhere the foam panel to the outside surface of the frame or in the alternative to the frame in the space behind the frame,
wherein the frame and foam panel cover the air intake opening sufficiently to require essentially all air flow into the intake opening to pass through the foam panel.

14. The filter device of claim 13 further comprising a hinge means hingeably attaching the frame to the housing allowing the frame to be swung away from the housing to expose the air intake opening.

15. The filter device of claim 13 wherein the hinge means further comprises a spring means to springably urge the rear edges of the side walls against the front surface of the housing.

16. The filter device of claim 13 wherein the shape and size of the frame, the space, and the foam are all sufficient to allow the foam panel to be adhesively attached either to the front surface or in the space behind the front surface.

17. A method of maintaining internal cleanliness in a computer apparatus that comprises a heat generating electronic mechanism in a housing with and air intake opening through the housing, the opening positioned to draw air into the housing by a draft from a fan means in the housing, the method comprising:
(A) providing a foam filtration panel comprising:
(i) an inside surface and an outer surface, the panel being of a size and shape sufficient to entirely cover the intake opening, and
(ii) adhesive means permanently adhered to the inside surface along lengthwise edges of the foam panel to provide a removable contact adhesive surface,
wherein the foam panel:
(a) is porous and permeable reticulated flexible polymeric foam having three-dimensional skeletal strands,
(b) has a pore size in the range of about 40 to about 90 pores per lineal inch, and
(c) has a thickness in the range of about 3/16 inch to about 5/16 inch, and
(B) adhesively adhering the contact adhesive surface of the foam panel to an outside surface of the computer housing and positioning the panel to cover the air intake opening sufficiently to require essentially all air flow into the intake opening to pass through the foam panel.

18. The method of claim 17 wherein the polymeric foam comprises polyester polymer.

19. The method of claim 17 wherein the contact adhesive strips are along the entire lengthwise edges of the foam panel.

20. The method of claim 17 wherein the pore size is 55 to 65 pores per lineal inch.

21. The method of claim 17 wherein the thickness of the foam panel is ¼ inch.

* * * * *